(12) United States Patent
Muthigi et al.

(10) Patent No.: US 7,195,298 B2
(45) Date of Patent: Mar. 27, 2007

(54) STABILITY RESTRAINT FOR VEHICLE SPARE WHEEL

(75) Inventors: Phaniraj Muthigi, Rochester Hills, MI (US); Paul Duncanson, Rochester, MI (US); Reza Keshtkar, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 100 days.

(21) Appl. No.: 11/006,953

(22) Filed: Dec. 8, 2004

(65) Prior Publication Data

US 2006/0119125 A1 Jun. 8, 2006

(51) Int. Cl.
B62D 43/10 (2006.01)

(52) U.S. Cl. .................. 296/37.2; 296/187.08; 296/35.2

(58) Field of Classification Search ........... 296/187.08, 296/35.2, 37.2, 1.04; 224/534, 42.12, 42.13, 224/42.18, 42.24, 42.26
See application file for complete search history.

(56) References Cited

U.S. PATENT DOCUMENTS

| | | | | |
|---|---|---|---|---|
| 2,214,937 A | * | 9/1940 | Ragsdale | 296/37.2 |
| 2,320,856 A | * | 6/1943 | Ehlers | 296/37.2 |
| 2,823,068 A | * | 2/1958 | Walker | 296/37.2 |
| 3,210,117 A | * | 10/1965 | Hall | 296/37.2 |
| 3,610,678 A | * | 10/1971 | Brokaw | 296/37.2 |
| 4,111,344 A | | 9/1978 | MacDonald | |
| 4,117,963 A | | 10/1978 | Luczynski | |
| 4,386,722 A | | 6/1983 | Gearhart | |
| 4,423,900 A | * | 1/1984 | Sugimoto et al. | 296/37.2 |
| 4,598,848 A | | 7/1986 | Clark | |
| 4,958,870 A | * | 9/1990 | Carter | 296/37.2 |
| 5,419,609 A | * | 5/1995 | Kmiec et al. | 296/37.2 |
| 5,487,288 A | * | 1/1996 | Frantz | 224/42.12 |
| 5,638,710 A | | 6/1997 | Howard, Jr. et al. | |
| 5,951,232 A | | 9/1999 | Yu et al. | |
| 5,954,246 A | * | 9/1999 | Golovoy et al. | 224/42.23 |
| 6,250,524 B1 | | 6/2001 | Maruyama | |
| 6,655,896 B2 | * | 12/2003 | Morin et al. | 296/37.2 |
| 2006/0028042 A1 | * | 2/2006 | Maeshima et al. | 296/37.2 |

* cited by examiner

*Primary Examiner*—Jason Morrow
(74) *Attorney, Agent, or Firm*—Ralph E. Smith

(57) ABSTRACT

Restraining a spare wheel in a vehicular floor recession during a vehicle rear impact event is accomplished by securing a connection member from a first anchoring location outside of the recession to a second location within the floor recession. The spare wheel lies in the recession and a threaded bolt attached to the floor under the spare wheel passes through the center hole of the spare wheel. The threaded bolt also passes through a spare wheel holding plate that resides on the spare wheel hub to distribute a holding force from the plate to the circumference of the hub created by screwing a threaded wing nut onto the bolt passing through the holding plate. Since the belt passes from the wheel center to a location outside of the wheel's perimeter, the wheel and tire are securely restrained during the transmission of forces during a vehicular rear impact event.

15 Claims, 4 Drawing Sheets

STABILITY RESTRAINT FOR VEHICLE SPARE WHEEL

FIELD OF THE INVENTION

The present invention relates to a restraint system for a spare wheel in an automotive vehicle and, more particularly, to an enabler for managing spare wheel motion during a rear impact of an automotive vehicle.

BACKGROUND OF THE INVENTION

Modern automotive vehicles typically store a spare wheel in a tub or recession below a false bottom in the rear of the vehicle. While suitable as a storage location, this false bottom location is also desired as a location to manage the spare wheel kinematics during a rear end collision to absorb collision forces and direct the collision forces to and within the rear structure of the vehicle.

In light of this desire, many current vehicles are being manufactured with a mechanical fastener attached to the floor pan where the spare wheel is stored to secure the spare wheel solely through the center hole of the spare wheel. While the use of the current center hole fastener provides a solution, that is, the fastener is capable of securing the spare wheel, realizing further management of collision forces is desired.

Accordingly, a need exists for a device that efficiently manages collision forces. This, in turn, will provide a vehicular device that, during a rear end collision, secures a spare wheel, limits a spare wheel's rotational energy, and controls the transmission of collision forces from the rear of the vehicle through the vehicular structure.

SUMMARY OF THE INVENTION

The teachings of the present invention provide an apparatus that includes first and second anchor locations on a vehicle body or chassis and first and second anchor bolts. One of the anchor locations is normally positioned above the hub of the spare wheel on a threaded shaft and the other anchor location is positioned outside of the radius of the spare wheel. A strap or connection member, such as a flexible belt or a semi-rigid or rigid connection member, is connected between the anchor locations. At the connection location above the hub of the spare wheel, an anchor bolt is placed through a spare wheel fastener that rests upon the hub of the spare wheel, and then the connection member and a lock washer are placed onto the anchor bolt. The spare wheel fastener, connection member and lock washer are secured onto their anchor bolt with a wing nut.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
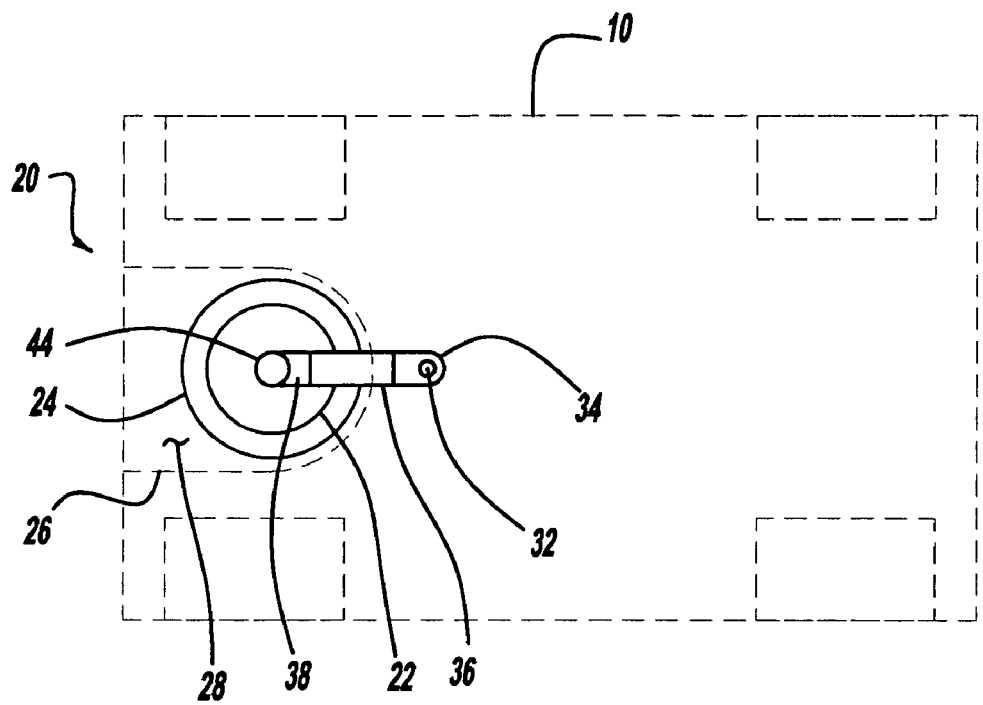
FIG. 1 is a top view of a vehicle and a stability restraint for a vehicle spare wheel, shown in a rear location of a vehicle, according to the present invention.
Figure 2:
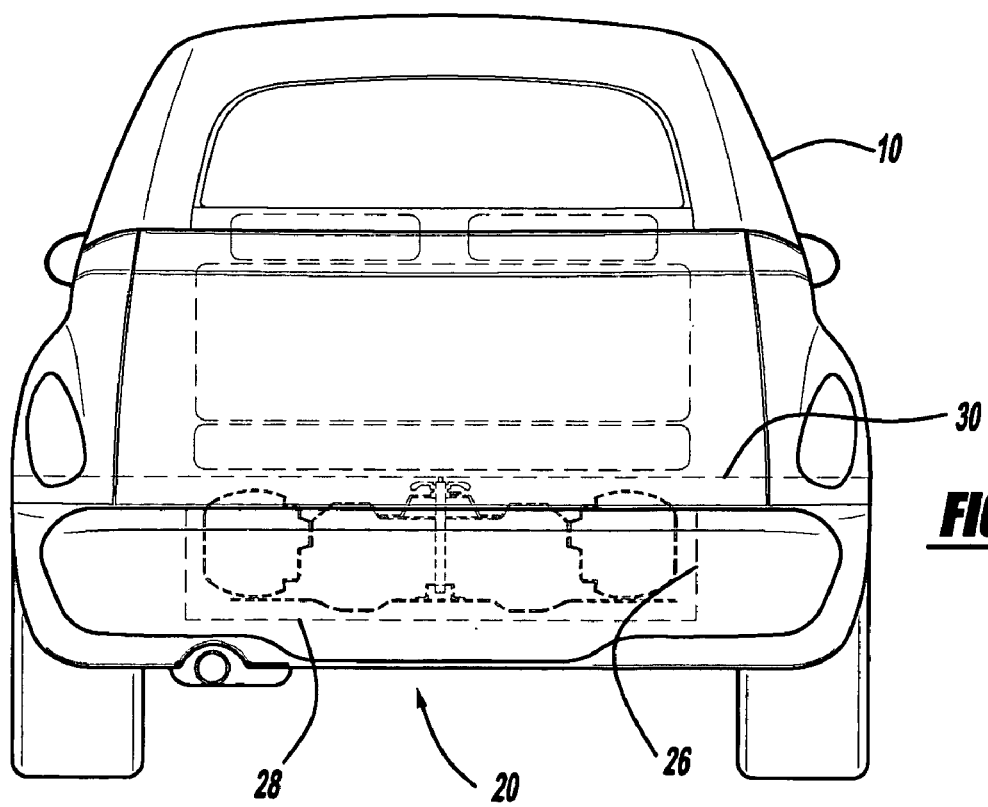
FIG. 2 is a rear view of a vehicle showing the stability restraint for a vehicle spare wheel in a recession of the vehicle floor, according to the present invention.

The following description of the preferred embodiments is merely exemplary in nature and is in no way intended to limit the invention, its application, or uses. With reference to FIGS. 1–2 and 5–8, the components of the stability restraint 20 will be explained. Later, with reference to FIGS. 3 and 4, more specific operation and effects of the stability restraint will be explained. FIG. 1 is a top view of a vehicle spare wheel stability restraint 20, shown in a rear location of a vehicle 10, according to teachings of the present invention. The stability restraint 20 secures a spare wheel 22, which normally secures a mounted spare tire 24. The spare wheel 22 resides within a tub or recession 26 formed in the floor pan 28 of the vehicle 10. The stability restraint 20 and spare wheel 22 also reside below a false floor 30 of the vehicle 10. In most instances, a person may lift this false floor 30 to reveal the spare wheel 22 and spare tire 24, in the event changing a wheel becomes necessary. FIG. 2 provides a cross-sectional view of the stability restraint in its installed position in the rear of the vehicle. Next, the components that are combined to form the stability restraint 20 and their operation will be explained.

Figure 5:
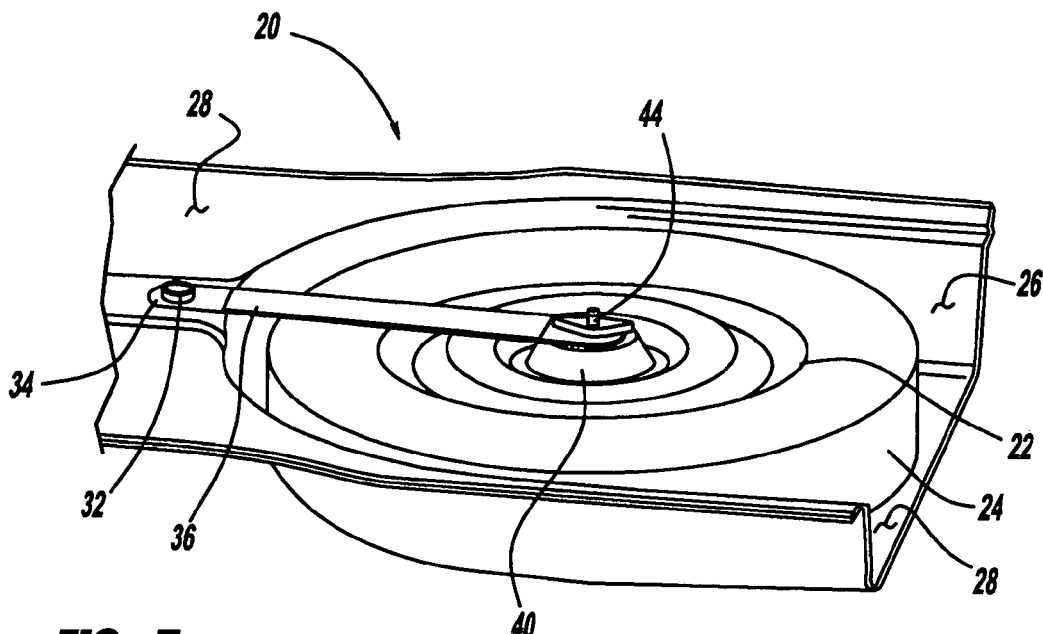
FIG. 5 is a perspective view of the stability restraint for a vehicle spare wheel according to the present invention.
Figure 6:
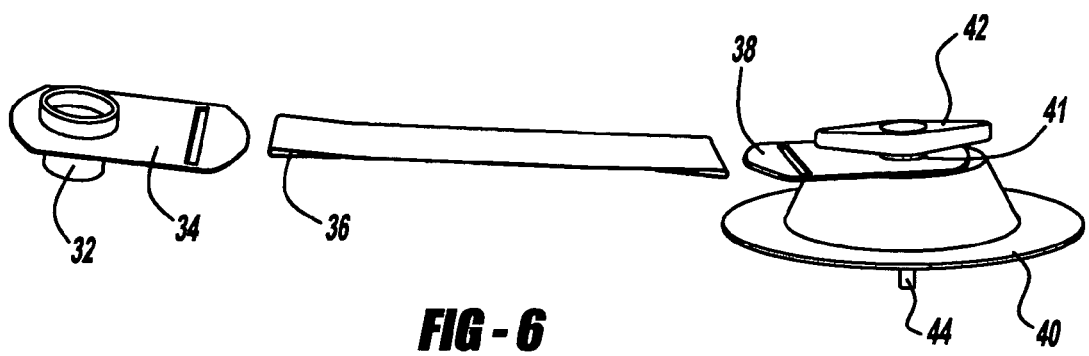
FIG. 6 is an exploded view of elements of the stability restraint for a vehicle spare wheel according to the present invention.

The stability restraint 20 utilizes an anchor bolt 32, an anchor member 34, a connection member 36, a connection member anchor 38 or belt anchor 38, a tie-down bolt 44, a spare wheel fastener 40, a lock washer 41 and an attachment nut 42. In one application of the stability restraint 20, the anchor bolt 32 is secured through the floor pan of the vehicle 10 outside of the radius of the spare wheel 22 to be secured by the stability restraint 20. Connected directly to the anchor bolt 32 is an anchor member 34. The anchor member 34 is a rigid piece having a through hole that is placed upon the anchor bolt 32 to facilitate joining of the connection member 36, a flexible belt in one embodiment, to the anchor bolt 32. Although the figures show that the connection member 36 is connected to an anchor member 34, which is connected to the anchor bolt 32, alternatives to this arrangement are possible. For instance, the connection member 36 may be directly secured to the floor pan 28, thus eliminating the anchor member 34 and the anchor bolt 32. In yet another alternative arrangement, the connection member 36 may be connected directly to the anchor bolt 32, without the use of the anchor member 34. The material from which the connection member 36 is made may directly influence the use of either an anchor bolt 32 or anchor member 34. Using the arrangement shown in FIG. 5, the connection member 36 is a flexible belt that fastens to the anchor member 34, which connects to the anchor bolt 32. FIG. 6 shows the individual parts of the stability restraint 20 in an exploded view Continuing with the parts that form the stability restraint 20, the end of the connection member 36 opposite to the anchor bolt 32 connects to a connection member anchor 38, also known as a belt anchor 38. This belt anchor 38 is located directly over the spare wheel 22 when the stability restraint 20 is assembled, as seen in FIGS. 3, 5 and 7–8. The belt anchor 38 has a through hole and slides upon a tie-down bolt 44 that is connected to the floor pan 28. The tie-down bolt 44 can either be directly connected to the floor pan 28 using a technique such as welding, or connected by screwing the tie-down bolt 44 into a tie-down bracket 46 that is welded or attached to the floor pan 28. The tie-down connection method using a tie-down bracket 46 can be seen in FIG. 8.

When the belt anchor 38 slides over the tie-down bolt 44 and into position, the belt anchor 38 rests on the spare wheel fastener 40, which also slides down over the tie-down bolt 44 and resides on the spare wheel hub 48. Lastly, to complete installation and assembly of the stability restraint 20, a lock washer 41 and a wing nut 42 or other threaded member, screws onto the threaded tie-down bolt 44.

Figure 8:
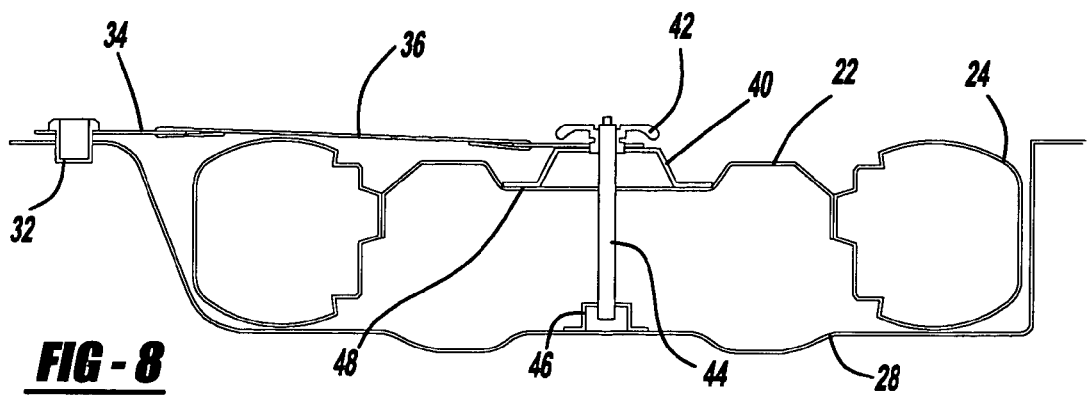
FIG. 8 is a cross-sectional view of the stability restraint for a vehicle spare wheel according to the present invention.
Figure 7:
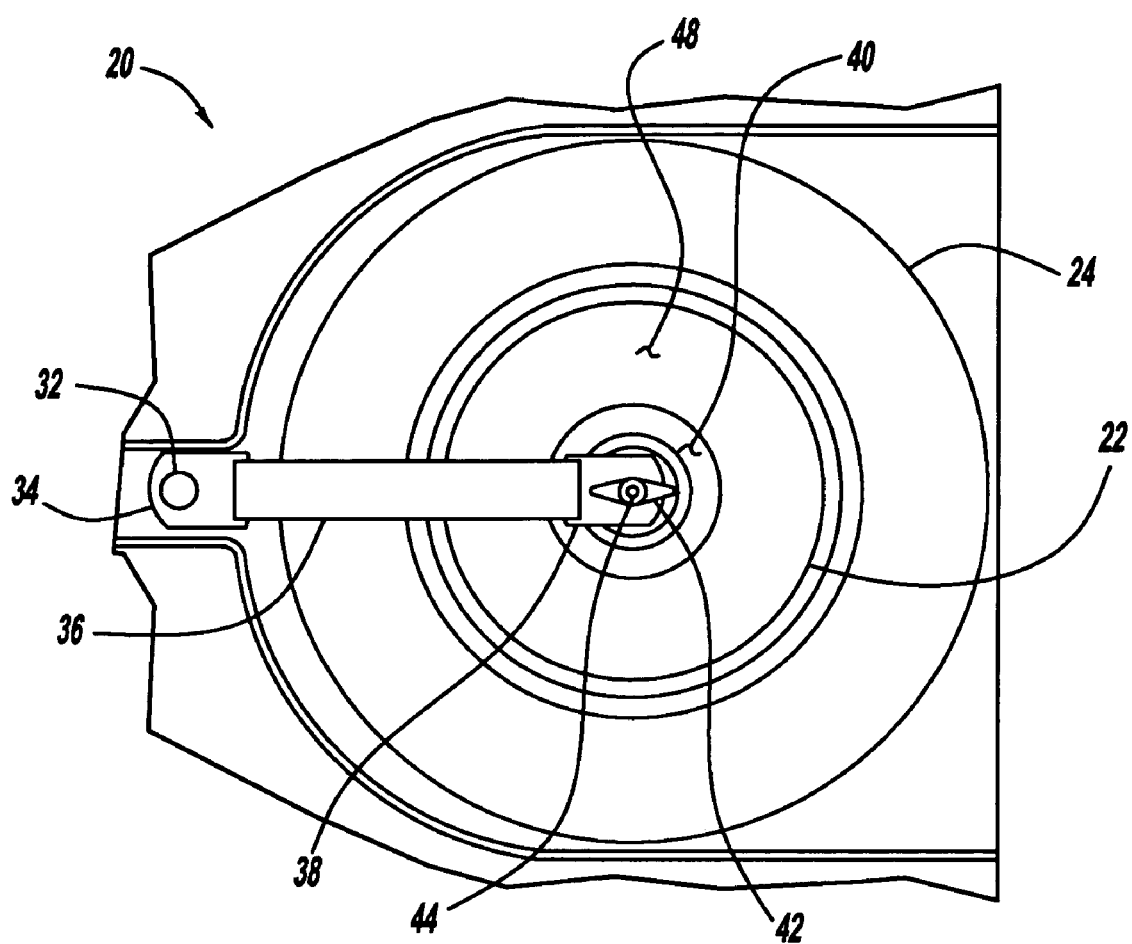
FIG. 7 is a top view of the stability restraint for a vehicle spare wheel according to the present invention.

When the stability restraint is in place and the connection member 36 is flexible, the connection member 36 is stretched taught between its first anchor location outside the periphery of the spare tire 24 and its second anchor location on the tie-down bolt 44. If the connection member 36 is not flexible, but rather is a solid member, the connection member will reside in nearly the same fashion as the flexible connection member 36. If the connection member is flexible, which is what it is when it is made from current state of the art seatbelt material, the connection member 36 may be looped through the first anchor member 34 and the second anchor member 38 and stitched onto itself to secure an anchor member 34, 38 at each end of the connection member 36. When the connection member 36 is not made of a flexible material, it may be directly connected to the first anchor bolt 32 and the tie-down bolt 44 without the use of the first anchor member 34 or connection member anchor 38. Regardless of whether the connection member is a flexible member or a solid member, the connection member may touch the spare tire 24 when installed, as shown in FIG. 8, the top view of which can be seen in FIG. 7.

Additionally, the flexible connection member 36 may lie horizontally, or at least parallel to the floor pan 28 or false floor 30, or it may form to the contour of the spare tire 24 where the connection member 36 passes over the spare tire 24. Whether the flexible connection member lies parallel to the false floor 30 will depend upon a variety of factors such as, the depth of the recession 26, the size of the spare tire 24, the height of the spare wheel fastener 40, the design of the spare wheel 22, and even the design of the spare wheel hub 48. Next, the operation of the stability restraint 20 will be explained.

Figure 3:
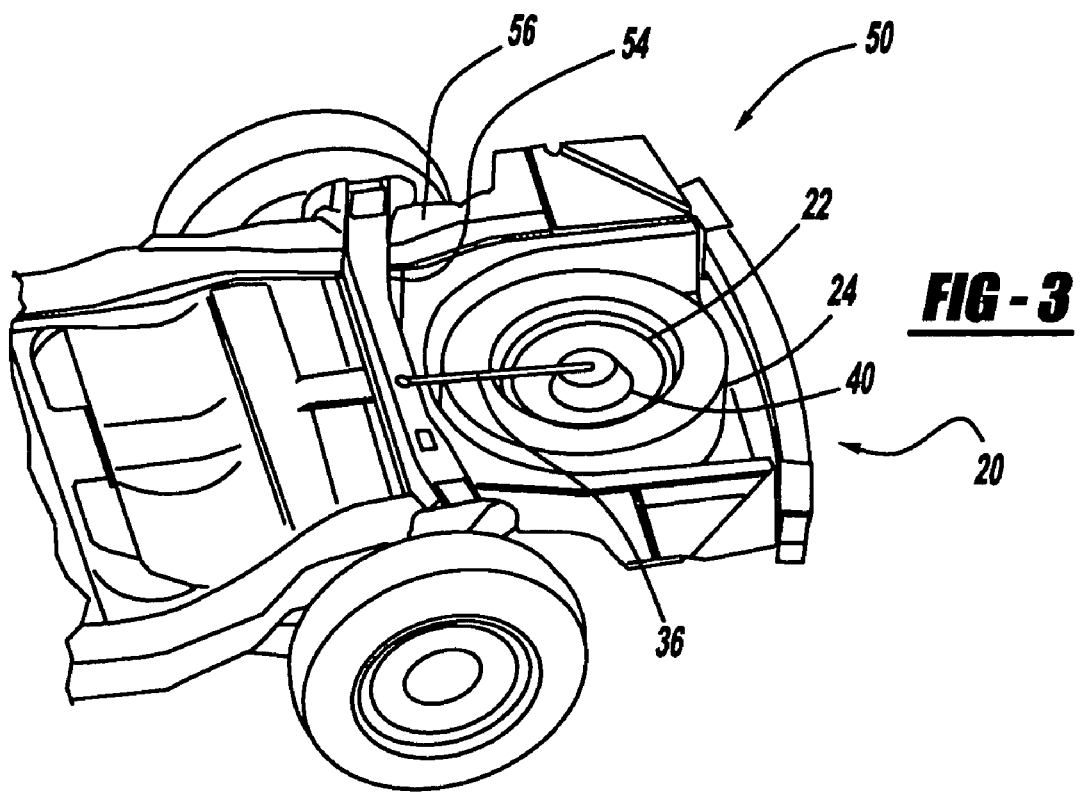
FIG. 3 is a perspective view of the rear of a vehicle showing the installation location of the stability restraint for a vehicle spare wheel according to the present invention.
Figure 4:
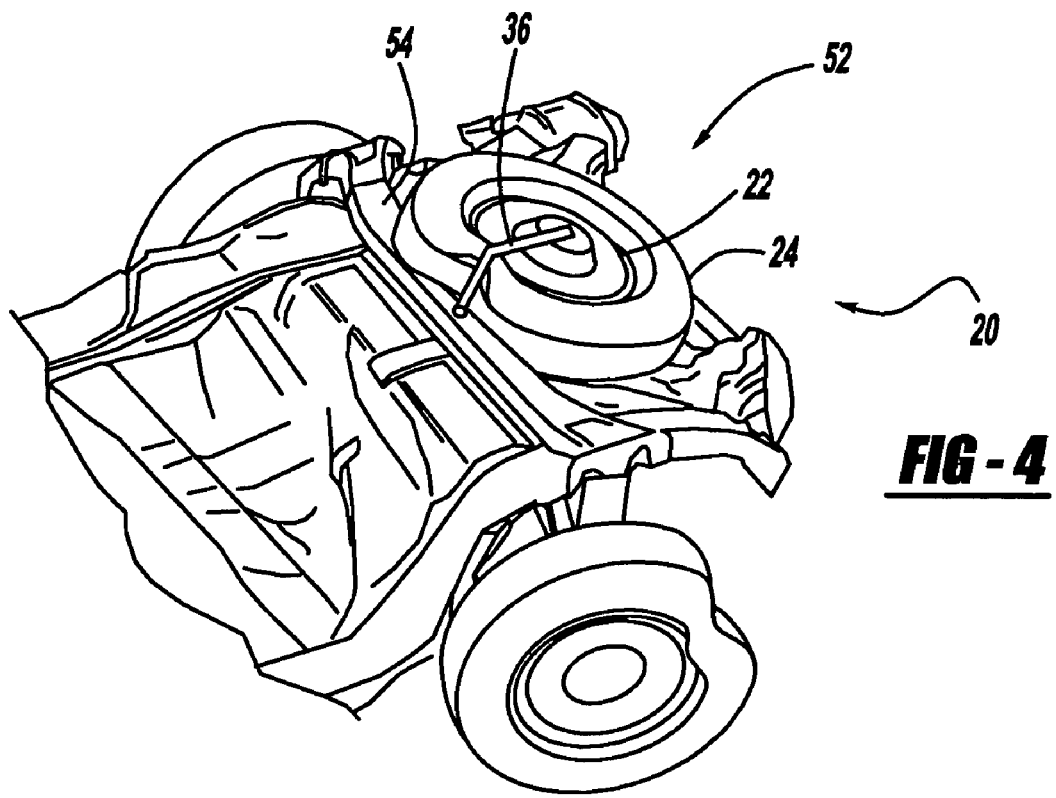
FIG. 4 is a perspective view of the effects on the stability restraint for a vehicle spare wheel in a vehicle that has experienced a rear end collision event, according to the present invention.

FIG. 3 is a perspective view of the rear of a vehicle chassis 50 in which a stability restraint for a vehicle spare wheel has been installed. FIG. 3 shows a vehicle chassis that has not experienced a rear end collision event. FIG. 4 is also a perspective view of the rear of a vehicle chassis 52 in which a stability restraint for a vehicle spare wheel has been installed; however, the difference between FIG. 3 and FIG. 4 is that in FIG. 4 the chassis 52 has experienced a rear end collision event. Continuing with FIG. 3, the connection member 36 is shown connected to a structural cross member 54 of the frame 56. Connecting the connection member 36 to the cross member 54 is an alternative to connecting the connection member 36 to the floor pan 28 of the vehicle 10, as shown in FIG. 5. Whether the connection member 36 is connected to the floor pan 28 of the vehicle or the cross member 54 depends upon a variety of factors including the vehicle chassis design, the size of the spare tire 24 and its hub 48, location and height of the false floor 30, etc.

Turning to FIG. 4, the effects of the stability restraint 20 in a vehicle that has experienced a rear end collision event are evident. When a vehicle in which the stability restraint 20 is installed is struck in its rear, the floor pan 28, in addition to other parts of the rear of the vehicle 10, begins to absorb energy from the colliding vehicle. In some instances, depending upon the direction of the forces of the collision, the rear end of the vehicle 10 may be pushed downward toward the surface of the road on which the vehicles are sitting. This downward force causes the rear portion of the spare tire 24 and spare wheel 22 to move or rotate downward and the front portion of the spare tire 24 and spare wheel 22 to move or rotate upward. Because of this motion, the connection member 36, with one end connected to either the floor pan 28 or the structural member 54 and its other end connected to the tie-down bolt 44 in the center of the spare wheel 22, restrains the spare wheel 22 from moving with respect to the floor pan 28 in the recession 26. As can be seen in FIG. 4, the connection member 36 restrains motion of the spare wheel 22 and spare tire 24. While the spare tire 24 may experience some deformation due to the connection member 36, rotation of the spare wheel 22 about an axis perpendicular to the longitudinal axis of the vehicle 10 occurs only to the extent of deformation of the floor pan 28 under the spare wheel 22.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for restraining a spare wheel of a vehicle comprising: a tie-down bolt extending through the spare wheel and adapted to be fixedly attached to the vehicle; an anchor member positioned radially outwardly from an outer perimeter of the spare wheel and adapted to be fixedly attached to the vehicle; and a strap adapted to be fixedly coupled to the anchor member and the tie-down bolt.

2. The apparatus of claim 1, wherein the anchor member is positioned on a floor of the vehicle.

3. The apparatus of claim 1, wherein the anchor member is positioned on a structural cross-body member of the vehicle.

4. The apparatus of claim 1, wherein the anchor member further comprises: an anchor bolt passing through a hole defined in the anchor member, the bolt coupled to a floor of the vehicle.

5. The apparatus of claim 1, wherein the apparatus further comprises: a spare wheel fastener coupled to the tie-down bolt.

6. The apparatus of claim 1, further comprising: a threaded wing nut installed on threads of the tie-down bolt to secure the strap.

7. The apparatus of claim 1, wherein the strap is flexible.

8. The apparatus of claim 1, wherein the strap is rigid.

9. The apparatus of claim 1, wherein the strap is parallel to a longitudinal axis of the vehicle.

10. An apparatus to restrain a spare wheel of a vehicle, comprising: an anchor bolt adapted to be attached to a structural vehicle cross-body member; a first anchor member connected to the anchor bolt; a tie-down bolt adapted to be attached to a floor of the vehicle under the spare wheel; a second anchor member connected to the tie-down bolt; and a strap connected to the first anchor member and the second anchor member, wherein the strap extends from the first anchor member to the second anchor member over the spare wheel.

11. The apparatus of claim 10, wherein the apparatus further comprises: a spare wheel fastener located on top of the spare wheel, the tie-down bolt passing through the spare wheel and the spare wheel fastener.

12. The apparatus of claim 10, further comprising: a wing nut that secures onto the tie-down bolt to secure the second anchor member on the tie-down bolt.

13. A vehicle, comprising: a floor pan defining a recession to hold a spare wheel; a first anchor bolt attached to the floor pan outside of the recession; a second anchor bolt attached to the floor pan within the recession; a spare wheel fastener, through which the second anchor bolt passes, the spare wheel fastener resident upon the spare wheel and securable with a nut upon the second anchor bolt; and a connection member coupled to the first anchor bolt and extending to the second anchor bolt, the connection member placed upon the spare wheel fastener and over the second anchor bolt and secured thereto with the nut.

14. The vehicle of claim 13, wherein the connection member is flexible.

15. The vehicle of claim 13, wherein the connection member is rigid.

* * * * *